(12) United States Patent
Ueno

(10) Patent No.: US 6,848,757 B2
(45) Date of Patent: Feb. 1, 2005

(54) ELASTIC CRAWLER TRAVELING APPARATUS AND SPROCKET FOR CRAWLER BELT USED IN THE SAME

(75) Inventor: Yoshio Ueno, Kishiwada (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/757,458

(22) Filed: Jan. 15, 2004

(65) Prior Publication Data

US 2004/0145240 A1 Jul. 29, 2004

Related U.S. Application Data

(62) Division of application No. 10/173,118, filed on Jun. 18, 2002, now Pat. No. 6,698,850.

(30) Foreign Application Priority Data

Jul. 3, 2001 (JP) ........................................ 2001-202764

(51) Int. Cl.[7] .......................... B60S 1/62; B62D 55/12; F16H 55/30; F16H 57/08; F16H 23/00
(52) U.S. Cl. ...................... 305/115; 305/195; 305/199; 474/901; 474/164
(58) Field of Search ............................... 305/115, 135, 305/137, 165, 169, 173–174, 193–195, 199; 474/152–154, 162, 164, 202–204, 901

(56) References Cited

U.S. PATENT DOCUMENTS

| | | | | |
|---|---|---|---|---|
| 2,854,294 A | * | 9/1958 | Bannister | 305/53 |
| 3,472,563 A | * | 10/1969 | Irgens | 305/112 |
| 3,899,219 A | * | 8/1975 | Boggs | 305/115 |
| 3,948,572 A | * | 4/1976 | Korner et al. | 305/195 |
| 4,072,062 A | * | 2/1978 | Morling et al. | 474/164 |
| 4,175,796 A | * | 11/1979 | Boggs et al. | 305/115 |
| 4,634,409 A | * | 1/1987 | Johnson et al. | 474/152 |
| 5,190,363 A | | 3/1993 | Brittain et al. | |
| 5,352,029 A | | 10/1994 | Nagorcka | |
| 5,409,306 A | * | 4/1995 | Bentz | 305/185 |
| 6,000,766 A | | 12/1999 | Takeuchi et al. | |
| 6,371,579 B1 | | 4/2002 | Phely | |
| 6,536,854 B2 | * | 3/2003 | Juncker et al. | 305/195 |
| 6,698,850 B2 | * | 3/2004 | Ueno | 305/115 |

FOREIGN PATENT DOCUMENTS

| | | |
|---|---|---|
| EP | 0 512 467 A2 | 11/1992 |
| EP | 1 044 870 A1 | 10/2000 |
| FR | 2 711 959 A1 | 5/1995 |

* cited by examiner

Primary Examiner—Russell D. Stormer
Assistant Examiner—Jason R. Bellinger
(74) Attorney, Agent, or Firm—Nixon Peabody LLP; David S. Safran

(57) ABSTRACT

An elastic crawler traveling apparatus having an elastic crawler in a shape of an endless belt, a sprocket for a crawler belt arranged to be brought into contact with an inner face of the elastic crawler, a driven wheel, and a rolling wheel, the elastic crawler including a belt main body, a plurality of projections formed to project at intervals along a peripheral direction on an inner face of the belt main body, and a tension member embedded at an inner portion of the belt main body for restricting elongation of the belt main body, in which the sprocket has a contact portion to contact the belt main body and a contact width of the contact portion in a belt width direction of the elastic crawler is wider than a root width of the projection in the belt width direction.

8 Claims, 15 Drawing Sheets

ELASTIC CRAWLER TRAVELING APPARATUS AND SPROCKET FOR CRAWLER BELT USED IN THE SAME

CROSS-REFERENCE TO RELATED APPLICATION

This application is a division of U.S. patent application Ser. No. 10/173,118 filed Jun. 18, 2002, now U.S. Pat. No. 6,698,850.

BACKGROUND OF THE INVENTION

1. Field of the Invention

The present invention relates to an elastic crawler traveling apparatus used for traveling, for example, on a soft ground in construction, civil engineering, agriculture or the like and a sprocket for a crawler belt used in the elastic crawler traveling apparatus.

2. Description of the Prior Art

An elastic crawler traveling apparatus having an elastic crawler formed by an elastic material of rubber or the like is currently used widely in an agricultural machine such as a combine and a construction operation machine such as a back hoe.

Conventionally, the elastic crawler traveling apparatus is mainly constituted by an elastic crawler formed in a shape of an endless belt, a sprocket for a crawler belt to be brought into contact with an inner face of the elastic crawler, a driven wheel, and a rolling wheel.

The sprocket for the crawler belt, the driven wheel and the rolling wheel are arranged at predetermined center distances therebetween and the elastic crawler can be circulatingly run by a transmission of driving force by the sprocket for the crawler belt.

An explanation will be given as follows of the elastic crawler and the sprocket for the crawler belt, the driven wheel and the rolling wheel in reference to FIG. 13 through FIG. 15.

FIG. 13 shows a state in which an elastic crawler and a sprocket for a crawler belt are brought into contact with each other.

An elastic crawler 42 shown in FIG. 13 is mainly constituted by a belt main body 47 in a shape of an endless belt, a plurality of projections 48 formed to project from an inner face of the belt main body 47 and a tension member 49 of a steel cord or the like embedded at an inner portion of the belt main body 47 for restricting elongation of the belt main body 47.

A plurality of the projections 48 are arranged at constant intervals over an entire periphery of the inner face of the belt main body 47.

The tension member 49 is provided for restricting elongation caused by an outwardly pushing force (hereinafter, referred to as extending tension force) exerted by a sprocket 43 for a crawler belt, the driven wheel 45 and the rolling wheel 46 to extend the elastic crawler 42 on the inner face of the elastic crawler 42.

A plurality of the tension members 49 are embedded within a constant embedding width (width designated by notation A, hereinafter, referred to as embedding width A) in a belt width direction (direction indicated by notation X, hereinafter, the direction is defined as a reference direction and the direction is simply referred to as belt width direction) of the belt main body 47.

The sprocket 43 for a crawler belt for driving the elastic crawler 42 is constituted by a drive tooth portion 51 in a rod-like shape fitted to a valley portion between the projections 48 for transmitting the driving force to the elastic crawler 42 and a pair of barrel portion main bodies 50 in a shape of a circular disk for sandwiching the drive tooth portion 51.

As shown by FIG. 13, a length of the drive tooth portion 51 in a longitudinal direction thereof and a root width (width indicated by notation D) of the projection 48 in the belt width direction are made to be substantially equal to each other and the barrel portion main bodies 50 are disposed so as to sandwich the drive tooth portion 51 therebetween.

A contact width in the belt width direction of a portion 56 of the sprocket 43 for the crawler belt in contact with the inner face of the crawler main body 47 is constituted by adding the length in the longitudinal direction of the drive tooth portion 51 and widths in the belt width direction of the barrel portion main bodies 50, and the contact width is indicated by notation E (hereinafter, the width is referred to as contact width E in the sprocket 43 of the crawler belt).

When the length in the longitudinal direction of the drive tooth portion 51 and the root width of the projection 48 are made to be substantially equal to each other as described above, and the drive tooth portion 51 are sandwiched by the barrel portion main bodies 50, in the case in which the elastic crawler 42 and the sprocket 43 for the crawler belt are shifted from each other in the belt width direction, a face on an inner side of the barrel portion main body 50 is brought into contact with the projection 48 to thereby enable to restrict the shift of the sprocket 43 for the crawler belt.

However, since a thickness (a width in the belt width direction) of the drive portion main body 50 is made to be as small as possible for light-weighted formation of the sprocket 43 for the crawler belt and a reduction in material cost, the contact width E in the sprocket 43 for the crawler belt is made smaller than the embedding width A.

A difference between the contact width E of the sprocket 43 for the crawler belt and the embedding width A is indicated by notation F, which is hereinafter referred to as a noncontact width F.

FIG. 14 shows a state in which the driven wheel 45 or the rolling wheel 46 and the belt main body 47 are brought into contact with each other.

In FIG. 14, either of the driven wheel 45 and the rolling wheel 46 constitutes a so-to-speak riding rolling wheel which rolls on an inner peripheral face of the belt main body 47 by riding over the projection 48. A contact width of a portion of the driven wheel 45 (or rolling wheel 46) in contact with the inner face of the belt main body 47 in the belt width direction is indicated by notation G (hereafter, referred to as contact width G in the driven wheel or the like).

Further, in FIG. 14, the contact width E of the sprocket 43 for the crawler belt is shown for comparison.

When the contact width E of the sprocket 43 for the crawler belt is compared with the contact width G of the driven wheel or the like, the contact width E of the sprocket 43 for the crawler belt and the contact width G of the driven wheel or the like are not completely coincident with each other although there are coincident portions thereof.

In this case, the tension member 49 disposed in a range in which the contact width E of the sprocket 43 for the crawler belt and the contact width G of the driven wheel or the like are coincident with each other (overlap each other) (hereinafter, referred to as coincident range) undergoes the extending tension force from the sprocket 43 for the crawler belt, the driven wheel 45 and the rolling wheel 46. However, the tension member 49 disposed outside of the coincident range undergoes the extending tension force only from the sprocket 43 for the crawler belt or only from the driven wheel or the like.

FIG. 15 is a sectional view taken along arrow marks Q—Q of FIG. 13, showing a state in which the elastic crawler 42 is wrapped around the sprocket 43 for the crawler belt.

The elastic crawler 42 is mounted around the sprocket 43 for the crawler belt with being pulled (being applied with tension) in a peripheral direction (direction indicated by notation Y) of the elastic crawler 42 (belt main body 8).

In this case, the rate of elongation caused by the pulling force differs between a portion of the belt main body 47 formed with the projection 48 and a portion thereof between the projections 48.

More specifically, the portion provided with the projection is difficult to elongate since the thickness of the belt main body 47 is thicker by an amount of the projection, while the portion of the belt main body 8 between the projections 48 is readily elongated.

Therefore, when tension is applied along the peripheral direction of the elastic crawler 2, a portion of the tension member 49 which is readily elongated (portion between the projections 9) is pulled to be linear to thereby constitute a form in which the linear portions are connected at the portion difficult to elongate. Accordingly, as shown by FIG. 15, the tension member 49 is deformed into a polygonal shape.

When the tension member 49 disposed in the coincident range is compared with the tension member 49 disposed outside of the coincident range as described above, the tension member 49 disposed in the coincident range undergoes the extending tension force at a plurality of portions by the sprocket for the crawler belt, the driven wheel, and the rolling wheel. Accordingly, a total of the tension member 49 disposed in the coincident range undergoes substantially uniform force, while the tension member 49 disposed outside of the coincident range undergoes local tension force only by the sprocket for the crawler belt or only by the driven wheel 45 (or the rolling wheel 46).

There poses a problem that when the tension member 49 undergoes local tension force as in the tension member 49 disposed outside of the coincident range as described above, the portion undergoing the tension force is liable to break.

Further, since the sprocket 43 for the crawler belt is not brought into contact with the inner face portion of the belt main body 47 (elastic crawler) corresponding to the noncontact width F, the portion is hardly exerted with tension force, whereby the tension force exerted on the tension member 49 disposed within the contact width E in the sprocket for the crawler belt and the tension force exerted on the tension member 49 disposed in the noncontact width F are not uniform.

In this case, the tension member exerted with a greater tension force (tension member disposed in the contact width E of the sprocket for the crawler belt) is liable to break and service life thereof is also shortened.

This is a problem caused by making the length in the longitudinal direction of the drive tooth portion substantially equal to the root width of the projection.

Further, when the tension member 49 is deformed into the polygonal shape, there poses a problem that local tension force is exerted on a portion of a corner in the polygonal shape and the portion is broken.

This is a problem caused by local application of the tension force on the tension member 49.

Hence, it is an object of the invention to provide an elastic crawler traveling apparatus capable of making exertion of local force to a tension member embedded in an elastic member as less as possible, and a sprocket for a crawler belt used in the elastic crawler driving apparatus.

It is an another object of the invention to provide a sprocket for a crawler belt capable of exerting uniform extension force to a wrapping portion of a tension member embedded in an elastic crawler.

SUMMARY OF THE INVENTION

According to an aspect of the invention, there is provided an elastic crawler traveling apparatus 1 including an elastic crawler 2 in a shape of an endless belt formed by an elastic material of rubber or the like; a sprocket 3 for a crawler belt arranged to be brought into contact with an inner face of the elastic crawler 2; a driven wheel 6; and a rolling wheel 7, wherein the elastic crawler 2 comprising a belt main body 8, a plurality of projections 9 formed to project at intervals therebetween along a peripheral direction on an inner face of the belt main body 8, and a tension member 14 of a steel cord or the like embedded at an inner portion of the belt main body 8 for restricting elongation of the belt main body 8, and wherein the sprocket 3 for the crawler belt includes a contact portion 17 in contact with the belt main body 8 having a contact width in the belt width direction which is wider than a root width B of the projection 9 in the belt width direction.

Since the range of coincidence can be widened by an amount of widening the contact width in the sprocket of the crawler belt relative to the root width in the belt width direction of the projection, exertion of local force to the tension member can be made as less as possible.

According to another aspect of the invention, there is provided an elastic crawler traveling apparatus 1 including an elastic crawler 2 in a shape of an endless belt formed by an elastic material of rubber or the like; a sprocket 3 for a crawler belt arranged to be brought into contact with an inner face of the elastic crawler 2; a driven wheel 6; and a rolling wheel 7, wherein the elastic crawler 2 comprising a belt main body 8, a plurality of projections 9 formed to project at intervals therebetween along a peripheral direction on an inner face of the belt main body 8, and a tension member 14 of a steel cord or the like embedded at an inner portion of the belt main body 8 for restricting elongation of the belt main body 8, and wherein the sprocket 3 for the crawler belt includes a contact portion 17 in contact with the belt main body 8 having a contact width in the belt width direction which is substantially equal to an embedding width of the tension member 14 in the belt width direction.

With this arrangement, the tension member in a portion of the elastic crawler wrapped around the sprocket for the crawler belt can be exerted with uniform extending tension force.

According to another aspect of the invention, the sprocket for the crawler belt comprises a plurality of drive tooth portions 12 to be engaged with the projections 9 and a barrel portion main body 10 integrally formed with the drive tooth portions 12 and a portion of the barrel portion main body 10 between the drive tooth portions 12 is formed with a recessed portion 11 for preventing a projected end portion of the projection 9 and the barrel portion main body 10 from being brought into contact with each other.

At an engaging portion (wrapping portion) of the elastic crawler and the sprocket for the crawler belt, the drive tooth portion is disposed between the projections, in other words, the projection is disposed between the drive tooth portions.

By providing such a recessed portion, a clearance is produced between the drive tooth portions and the projections and, therefore, soil (mud) or the like becomes difficult to be stuck on the barrel portion main body and the soil (mud) or the like is easily discharged.

According to another aspect of the invention, the sprocket 3 for the crawler belt comprises a plurality of drive tooth portions 12 to be engaged with the projections 9 and a barrel portion main body 10 integrally formed with the drive tooth portions 12. Each pair of the projections 9 adjacent in the peripheral direction of the elastic crawler form a valley portion therebetween as an engaging groove 15 to be engaged with the drive tooth portion 12. The drive tooth portion 12 comprises a driving portion 18 to be engaged with the engaging groove 15, and a guide portion 19 to be engaged with the projection 9 in the belt width direction for restricting a shift of the drive tooth portion 12 and the projection 9 in the belt width direction relative to each other.

This arrangement can restrict a shift of the sprocket for the crawler belt relative to the elastic crawler in the belt width direction and a disengagement of sprocket for the crawler belt from the elastic crawler.

According to another aspect of the invention, the sprocket 3 for the crawler belt comprises a drive tooth portion 12 in a rod-like shape to be engaged with the projection 9, and a pair of barrel portion main bodies 10 having a cylindrical shape and sandwiching the drive tooth portion 12 therebetween, and the barrel main body 10 defines along its peripheral portion a plurality of mud discharging holes 27 for discharging soil, mud or the like.

This arrangement improves mud discharging performance of the sprocket for the crawler belt.

The drive tooth portion 12 has opposite ends in the longitudinal direction thereof each of which is brought into contact with and integrated with each of the pair of barrel portion main body 10 on a side edge in the widthwise direction thereof facing its counterpart main body 10. A plurality of the drive tooth portions 12 are arranged at intervals along the periphery of the barrel portion main body 10, and the mud discharging holes 27 are preferably disposed along the periphery of the barrel portion main body 10 at intervals on a position between the positions on which the drive tooth portions 12 are disposed.

Because the peripheral portion of the barrel portion main body 10 in correspondence with the position provided with the drive tooth portion 12 is brought into contact with the inner face of the belt main body along with the drive tooth portion, the peripheral portion can exert uniform extension force to the tension member embedded in the belt main body by providing the mud discharging hole avoiding the portions to which the drive tooth portions 12 are disposed.

According to another aspect of the invention, the contact portion 17 includes a contact portion 17a in contact with the belt main body 8 having a width corresponding to the root width B of the projection 9 in the belt width direction and radially outwardly projecting relative to other portion 17b of the contact portion 17.

By projecting a part of the contact portion 17 in correspondence with the root width in the belt width direction of the projection formed to project from the inner face of the elastic crawler (belt main body), the tension member 14 deformed into a polygonal shape can be outwardly pushed at a portion in correspondence with one side of the polygonal shape from an inner face side of the elastic crawler 2, whereby an angle of a corner of the polygon can be increased. As a result, deformation of the tension member is further alleviated, whereby exertion of local force on the tension member can be made as less as possible.

According to another aspect of the invention, the guide portion 19 includes a pair of right and left restricting faces 21 to be brought into contact with the opposite sides of the projection 9 in the belt width direction for restricting the shift of the projection 9 relative to the drive tooth portion 12 in the belt width direction.

With this arrangement, when the elastic crawler and the sprocket for the crawler belt are shifted from each other in the belt width direction, the restricting face is brought into contact with the projection and further shift is prevented so that the sprocket is hardly disengagement from the elastic crawler.

According to another aspect of the invention, each of the restricting faces 21 is inclined so that a clearance from the projection 9 increases toward each of opposite ends of the guide portion in the belt width direction.

With this arrangement, when soil (mud) or the like entered into the clearance between the projection and the restricting face, and the projection and the restricting face is going to be brought into contact with each other, since the restricting face is inclined, the soil (mud) or the like is hardly brought into press contact with the restricting face and hardly stuck thereon.

DETAILED DESCRIPTION OF THE PREFERRED EMBODIMENTS

The present invention will now be described in detail by way of the preferred embodiment thereof illustrated in the attached drawings.

Figure 12:
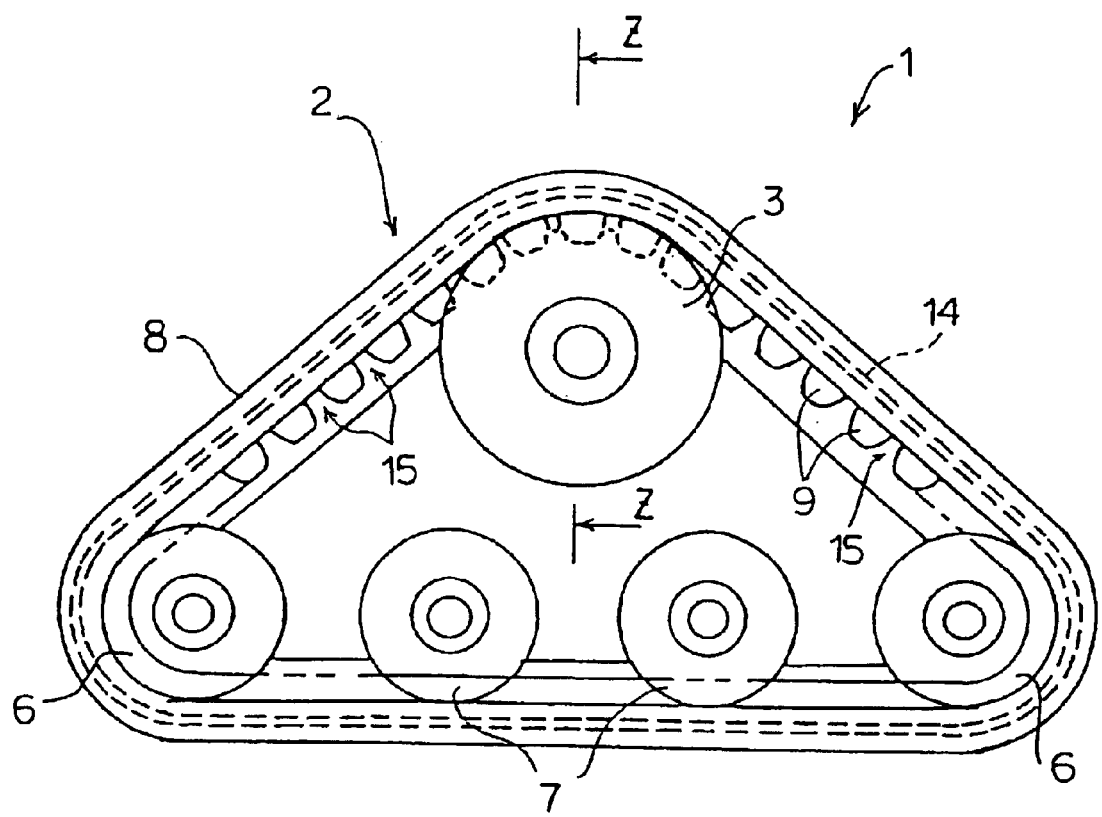
FIG. 12 is a side view showing an embodiment of an elastic crawler traveling apparatus according to the invention.
Figure 13:
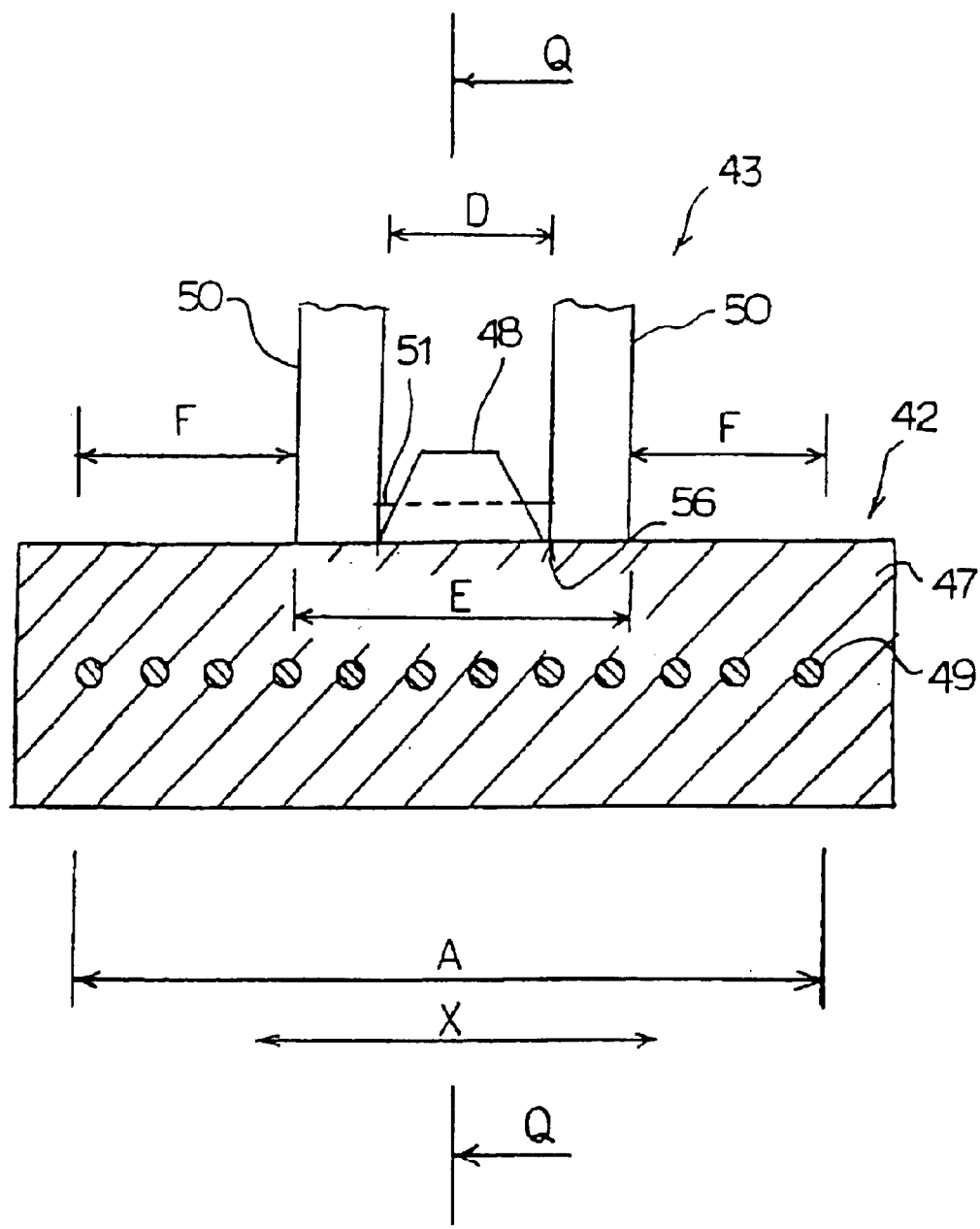
FIG. 13 is a sectional view showing a state in which a sprocket for a crawler belt and an elastic crawler of a conventional elastic crawler traveling apparatus are in contact with each other.
Figure 14:
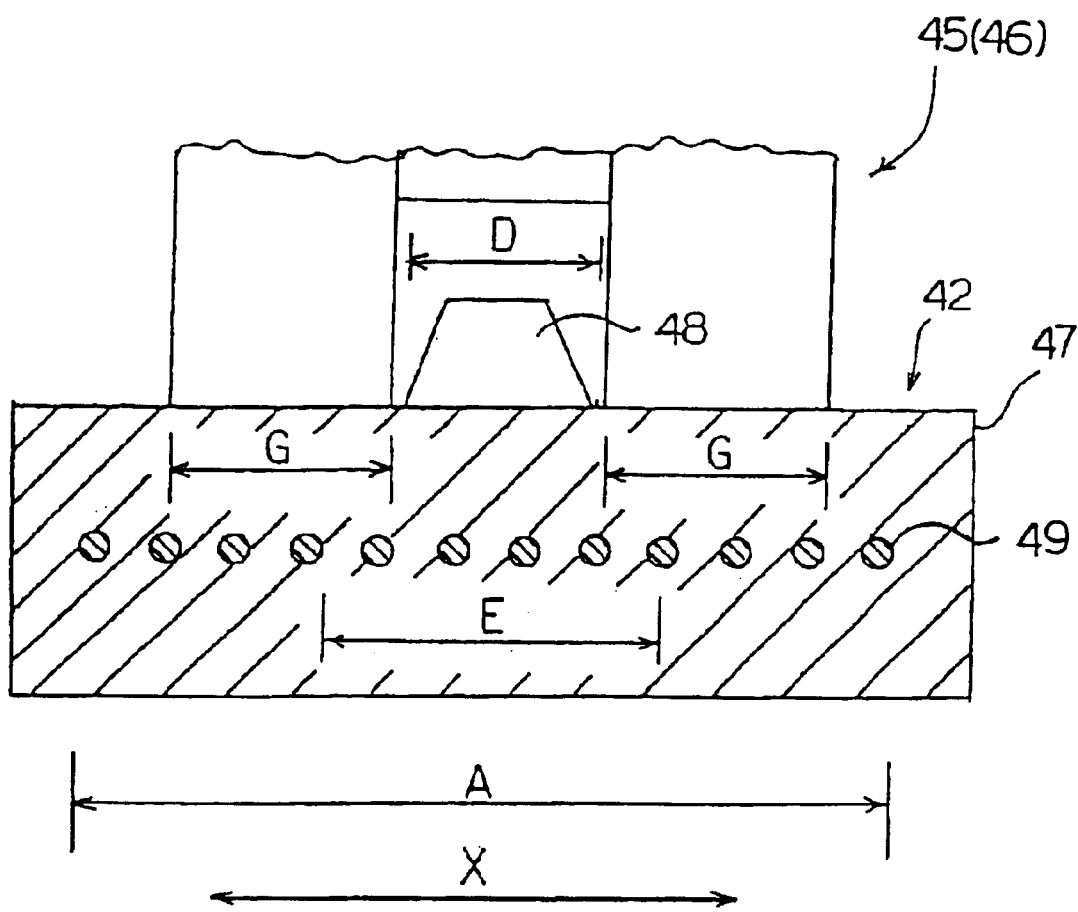
FIG. 14 is a sectional view showing a state in which a driven wheel (or rolling wheel) and an elastic crawler of a conventional elastic crawler traveling apparatus into contact with each other.

FIG. 12 shows an example of an embodiment of an elastic crawler traveling apparatus according to the invention.

An elastic crawler traveling apparatus 1 according to the invention is mainly constituted by an elastic crawler 2 formed in a shape of an endless belt by an elastic material of rubber or the like, a sprocket 3 for a crawler belt constituting a drive wheel for driving the elastic crawler 2, and a driven wheel 6 and a rolling wheel 7 each arranged to be in contact with an inner face of the elastic crawler 2 at a predetermined center distance from the sprocket 3 for the crawler belt.

Further, by arranging the sprocket 3 for the crawler belt, the driven wheel 6 and the rolling wheel 7 respectively at predetermined center distances therebetween, the elastic crawler 2 can circulatingly be run by being transmitted with driving force by the sprocket 3 for the crawler belt.

The elastic crawler 2 is mainly constituted by a belt main body 8, a plurality of projections 9 formed to project from an inner face of the belt main body 8 and a tension member 14 of a steel cord or the like embedded at an inner portion of the belt main body 8 for restricting elongation of the belt main body 8 in a longitudinal direction thereof.

A plurality of the projections 9 are arranged at constant intervals on the inner face of the belt main body 8 over an entire periphery in a peripheral direction thereof.

A valley portion between the projection 9 constitutes an engaging groove 15 to be engaged with the sprocket 3 for the crawler belt for transmitting the driven force.

Further, the tension member 14 is provided for restricting elongation of the elastic crawler in a longitudinal direction thereof caused by a force of the sprocket for the crawler belt, the driven wheel 6, and the rolling wheel 7 to push to elongate the elastic crawler 2 from an inner side thereof (hereinafter, referred to as extending tension force).

The tension member 14 is embedded within a constant embedding width in a belt width direction (hereinafter, the direction defines a reference direction and is simply referred to as belt width direction) of the belt main body 8.

Figure 3:
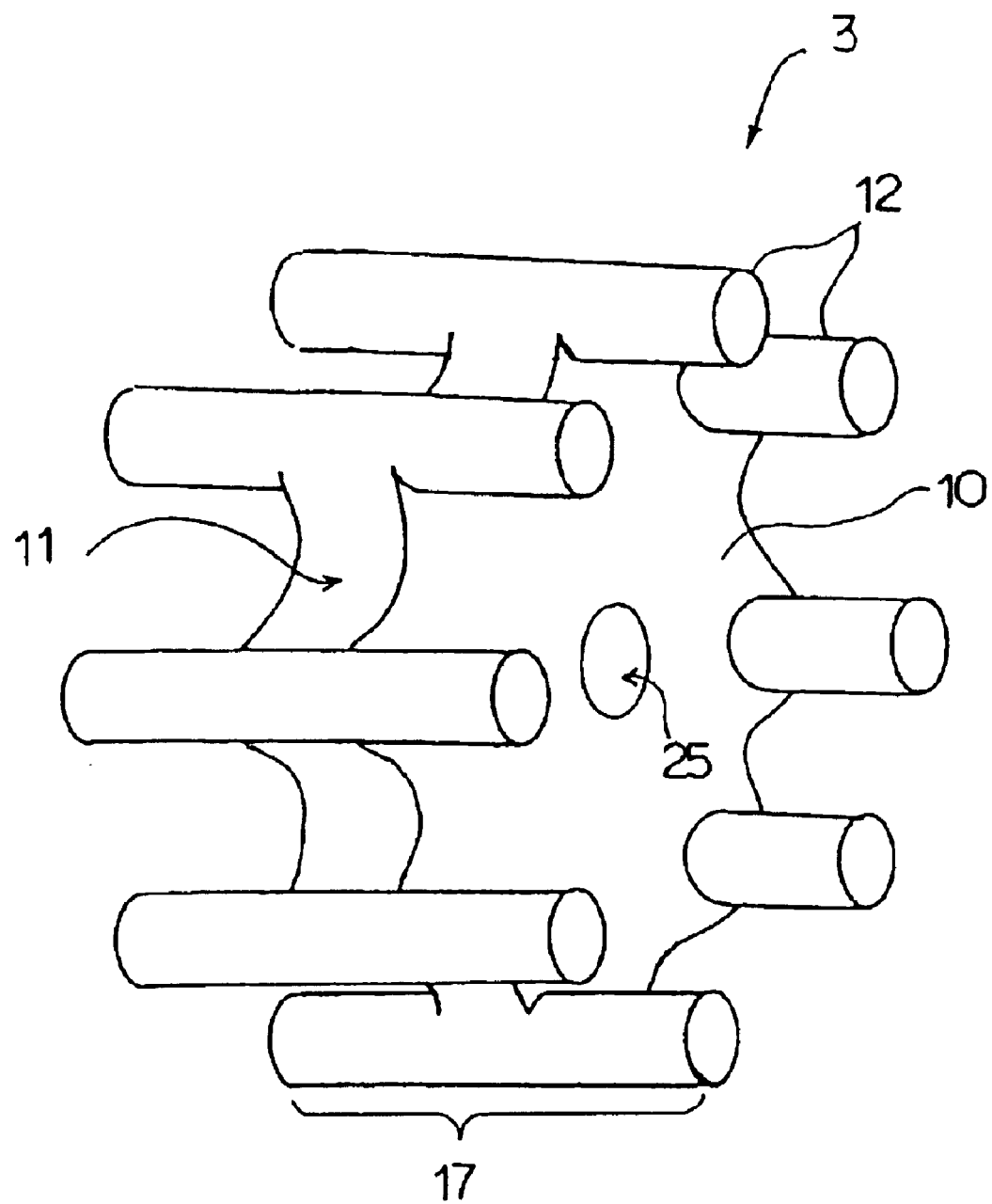
FIG. 3 is a perspective view showing a first embodiment of a sprocket for a crawler belt according to the invention.

FIG. 3 shows a first embodiment of a sprocket for a crawler belt according to the invention.

The sprocket 3 for the crawler belt has substantially a shape of a star in side view and is constituted by a drive tooth portion 12 to be fitted into the engaging groove 15 for transmitting the driving force, and a barrel portion main body 10 for supporting the drive tooth portion 12.

The drive tooth portion 12 is formed in a cylindrical shape to be fitted into the engaging groove 15 so as to transmit the driving force.

Figure 4:
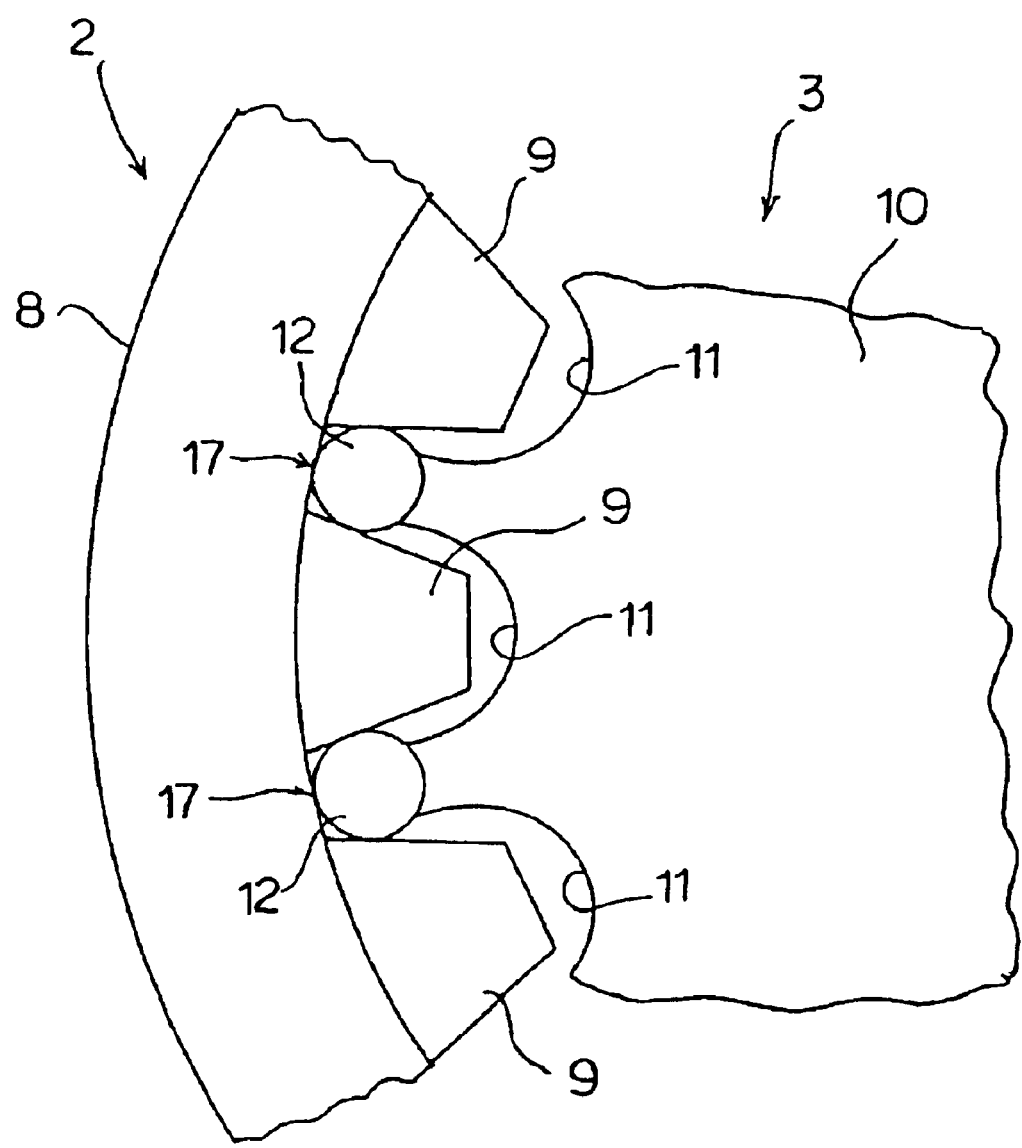
FIG. 4 is a partial side view showing a state in which the sprocket for a crawler belt and an elastic crawler in contact with each other according to the first embodiment.

FIG. 4 is a partial side view showing a state in which the elastic crawler is wrapped around the sprocket for the crawler belt according to the first embodiment.

The drive tooth portion 12 of the sprocket 3 for the crawler belt is fitted into the engaging groove 15, and the drive tooth portion 12 is in contact with the inner face of the belt main body 8 at a contact portion 17 on the top end portion thereof in view from a side of the barrel portion main body 10.

A recessed portion 11 formed between the drive tooth portions 12 on the barrel portion main body 10 has a depth for preventing the recessed portion 11 from contacting a projected end portion of the projection 9.

Since the recessed portion 11 is formed such as to be prevented from contacting the projected end portion of the projection 9, a clearance is produced between the projection 9 and the recessed portion 11 in the wrapping state, thereby facilitating discharge of soil (mud) or the like brought into the clearance from the sprocket 3 for the crawler belt.

Further, there is formed a shaft insertion hole 25 for mounting a drive shaft for transmitting the driving force at a center of the barrel portion main body 10.

Figure 5:
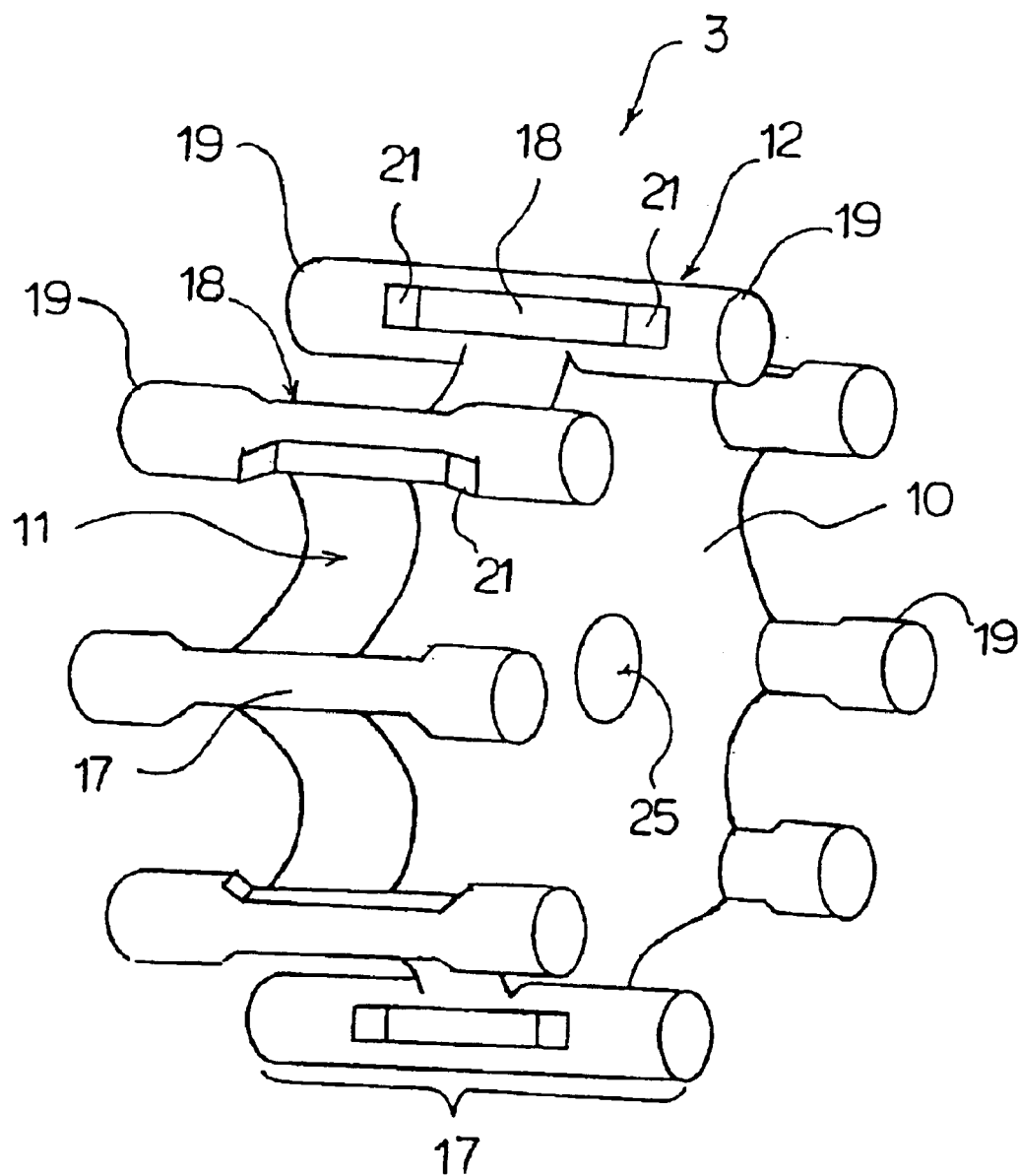
FIG. 5 is a perspective view showing a second embodiment of a sprocket for a crawler belt according to the invention.

FIG. 5 shows a second embodiment of a sprocket for a crawler belt according to the invention.

According to the sprocket 3 for the crawler belt shown in FIG. 5, both end portions in a longitudinal direction of the drive tooth portion 12, constitute guide portions 19 for restricting lateral shift (shift in the belt width direction) between the sprocket 3 for the crawler belt (drive tooth portion 12) and the elastic crawler 12 relative to each other.

The guide portion 19 is formed with a restricting face 21 for restricting the lateral shift.

When the lateral shift occurs, the restricting face 21 is brought into contact with the projection 9 thereby restricting further shift of the sprocket 3 for the crawler belt.

Figure 1:
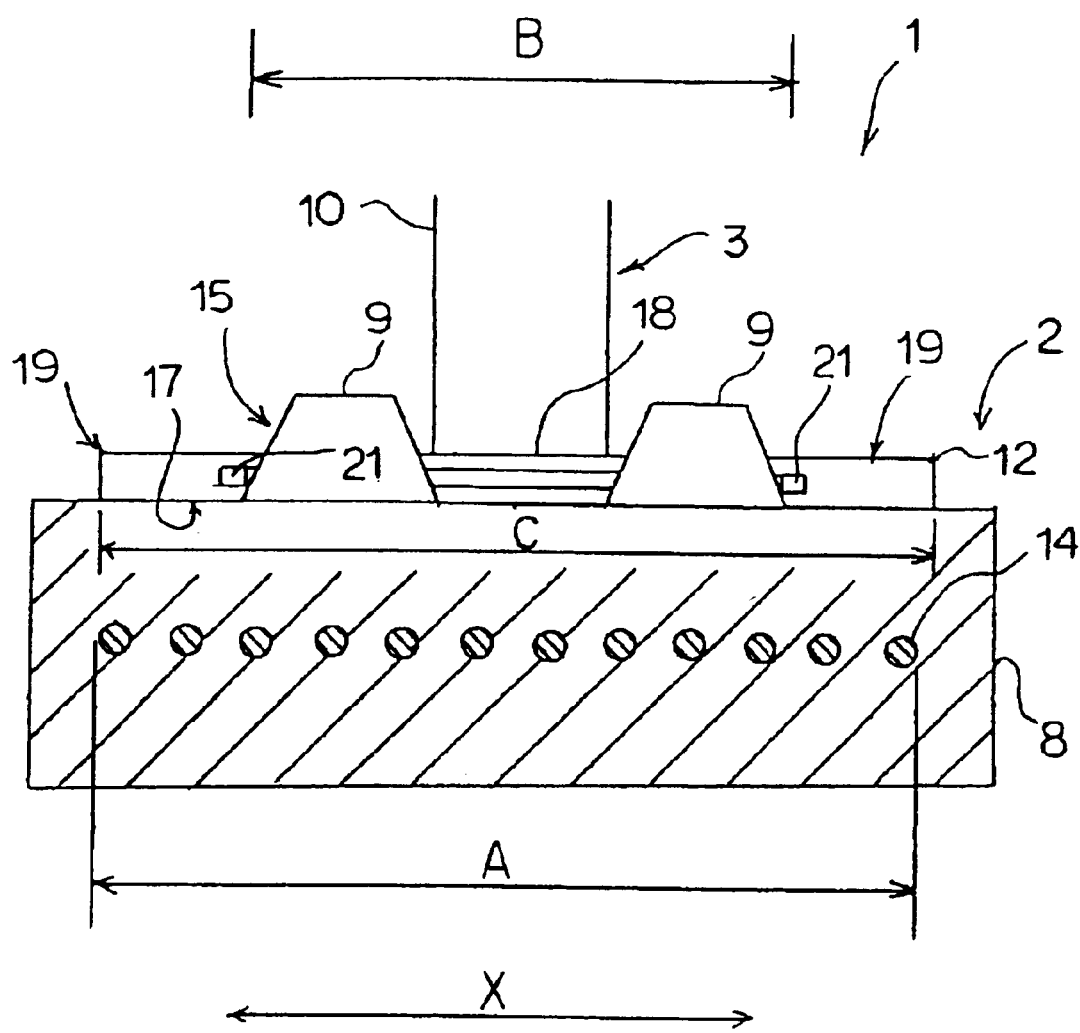
FIG. 1 is a sectional view taken along arrow marks Z—Z in FIG. 12 showing a state in which a sprocket for a crawler belt and an elastic crawler according to the invention are in contact with each other.

FIG. 1 shows a state in which the sprocket 3 for the crawler belt according to the second embodiment is brought into contact with the elastic crawler 2.

As shown by FIG. 1, a contact width (width designated by notation C) of the contact portion 17 of the sprocket 3 for the crawler belt in the belt width direction (direction indicated by notation X, the same as follows in other drawings) is made wider than a root width (width designated by notation B) of the projections 9 in the belt width direction and is made substantially equal to an embedding width (width designated by notation A) of the tension member 14 in the belt width direction.

Since the contact width C of the contact portion 17 is wider than the root width B and substantially equal to the embedding width A of the tension member 14, the sprocket 3 for the crawler belt (or drive tooth portion 12) in the wrapped state can transmit uniform force to the tension member 14 disposed within the embedding width A, in other words, extending tension force can be uniformly exerted on the tension member 14 disposed within the embedding width A.

Figure 6:
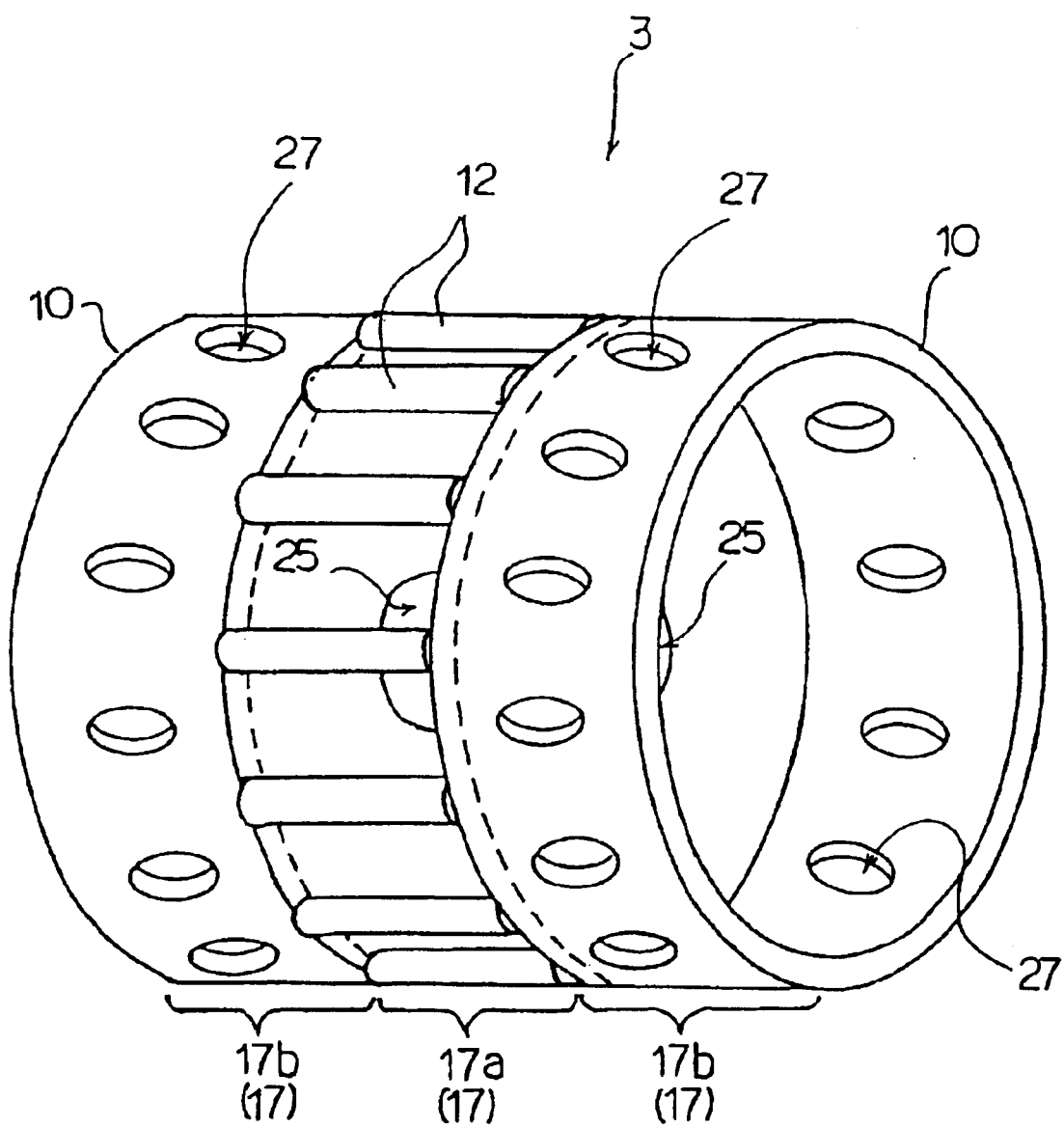
FIG. 6 is a perspective view showing a third embodiment of a sprocket for a crawler belt according to the invention.

FIG. 6 shows a third embodiment of a sprocket for a crawler belt according to the invention.

According to the third embodiment, the sprocket 3 is constituted by a pair of barrel portion main bodies 10 in a cylindrical shape (drum), and a drive tooth portion 12 in a rod-like shape provided between the main bodies 10 in a sandwiching manner, wherein each of opposite ends of the drive tooth portion 12 in the longitudinal direction thereof is integrally connected to each of the main bodies 10 on a side edge in the widthwise direction thereof facing its counterpart main bodies 10.

A plurality of the drive tooth portions 12 are arranged at constant intervals along the periphery of the barrel portion main bodies 10.

The barrel portion main body 10 is formed along the peripheral portion thereof with a plurality of mud discharging holes 27 for discharging soil (mud) or the like brought between the sprocket 3 for the crawler belt and the elastic crawler 2 in a state where the elastic crawler 2 is wrapped around the sprocket 3 for the crawler belt.

The mud discharging holes 27 are disposed at predetermined intervals along the peripheral direction of the barrel portion main body 10.

Figure 2:
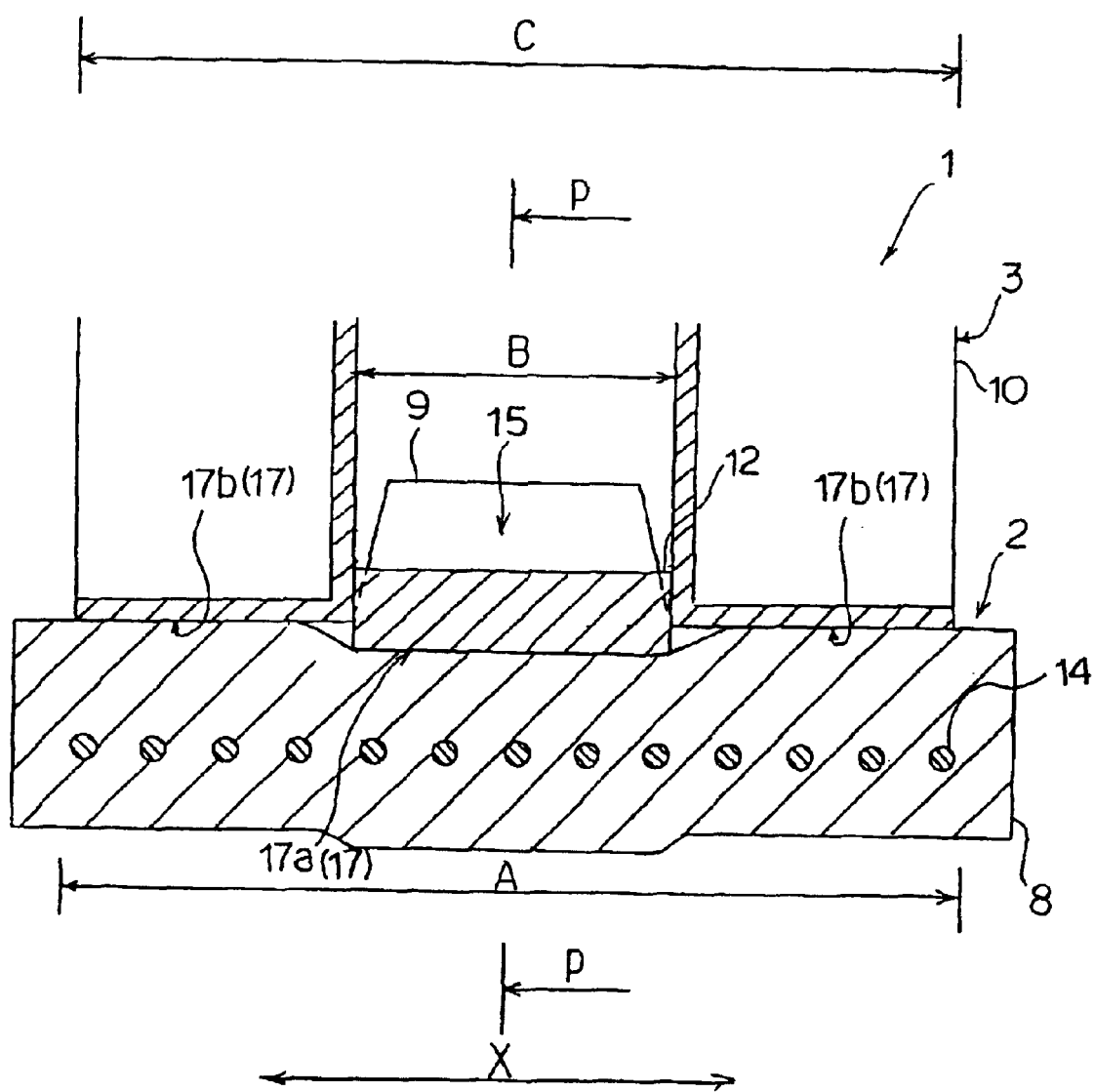
FIG. 2 is a sectional view showing a state in which a sprocket for a crawler belt and an elastic crawler according to the invention are in contact with each other.

FIG. 2 shows a state in which the sprocket 3 for the crawler belt according to the third embodiment is brought into contact with the elastic crawler 2.

As shown by FIG. 2, the contact portion 17 in contact with the belt main body 8 in the sprocket 3 for the crawler belt includes a portion 17a at which the drive tooth portion 12 is brought into contact with the belt main body 8, and side portions 17b of the barrel main body 10 disposed on opposite sides of the portion 17a.

In the contact portion 17, the portion 17a corresponding to the root width B in the belt width direction of the projection 9 formed to project from the inner face of the belt main body 8, that is, the portion 17a to be brought into contact with the belt main body 8 is formed to radially outwardly project relative to other contact portion, that is, the side portions 17b of the barrel portion main body 10.

The contact width C of the contact portion 17 in the belt width direction is made to be substantially equal to the embedding width A in the belt width direction of the tension member 14.

When both of the drive tooth portion 12 and the barrel portion main body 10 are brought into contact with the elastic crawler 2 in this way, since the contact width C in the belt width direction of the contact portion 17 at which the drive tooth portion 12 and the barrel portion main body 10 are brought into contact with the elastic crawler 2 substantially equal to the embedding width A of the tension member 14, extending tension force can be uniformly exerted on the tension member 14 disposed within the embedding width A.

Further, as described above, the plurality of mud discharging holes 27 are formed at predetermined intervals along the peripheral portion of the barrel portion main body 10. More specifically, it is preferable to form the mud discharging hole 27 at a position of the barrel portion main body 10 avoiding the contact portion 17, that is, at a portion of the peripheral portion of the barrel portion main body 10 in correspondence with an interval between the drive tooth portions 12, in which the predetermined interval refers to the interval between the mud discharging holes 27 formed in this way.

Figure 7:
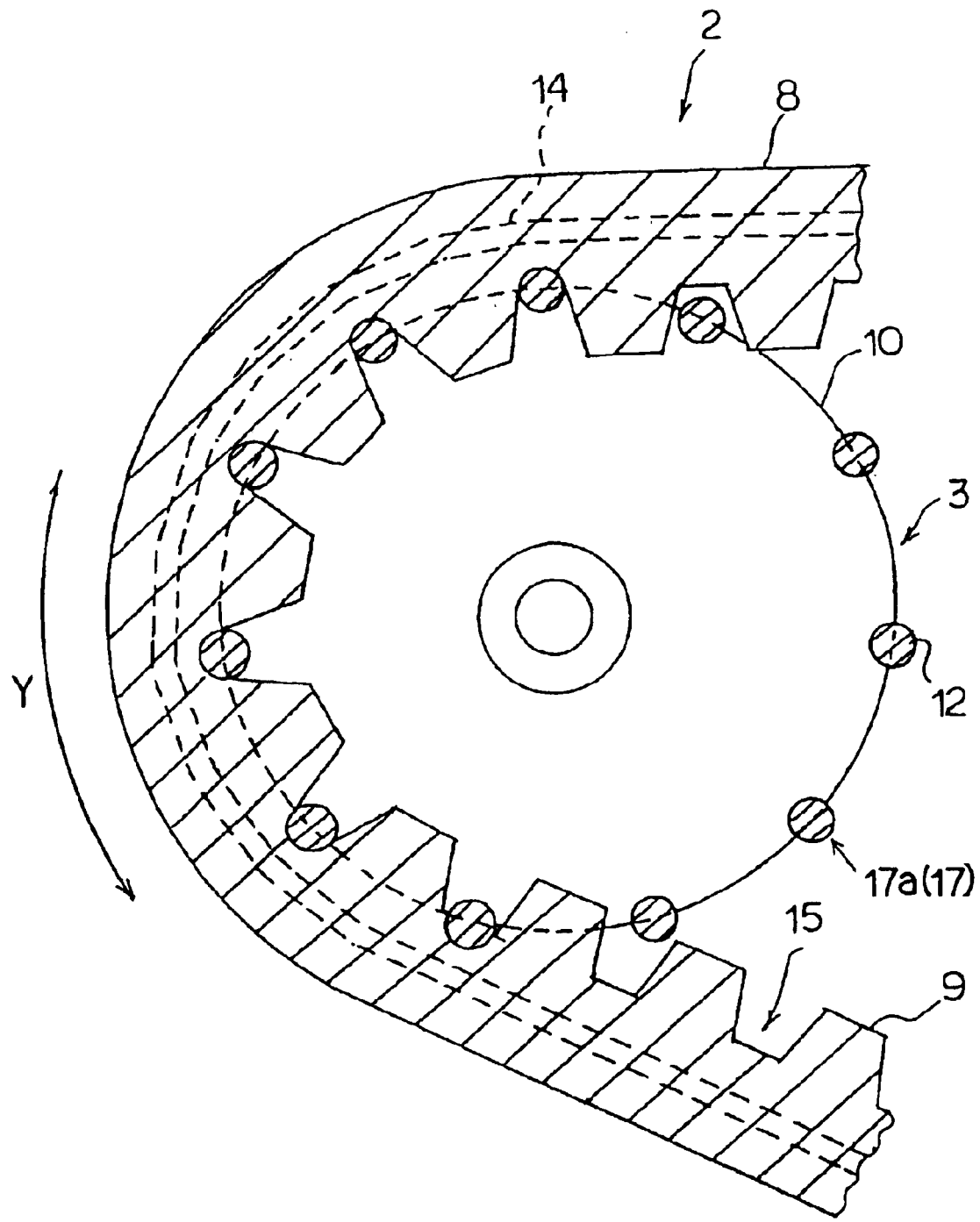
FIG. 7 is a sectional view taken along arrow marks P—P in FIG. 2.

FIG. 7 shows a sectional view taken along arrow marks P—P of FIG. 2.

As described above referring to FIG. 2, since the drive tooth portion 12 is formed to project from the barrel portion main body 10, when the drive tooth portion 12 is brought into contact with the belt main body 8, the projecting drive tooth portion 12 pushes the belt main body 8, thereby pushing the tension member 14 in accordance therewith to radially outwardly elongate the tension member 14 from the center of the sprocket 3 for the crawler belt by a pushed amount.

Figure 15:
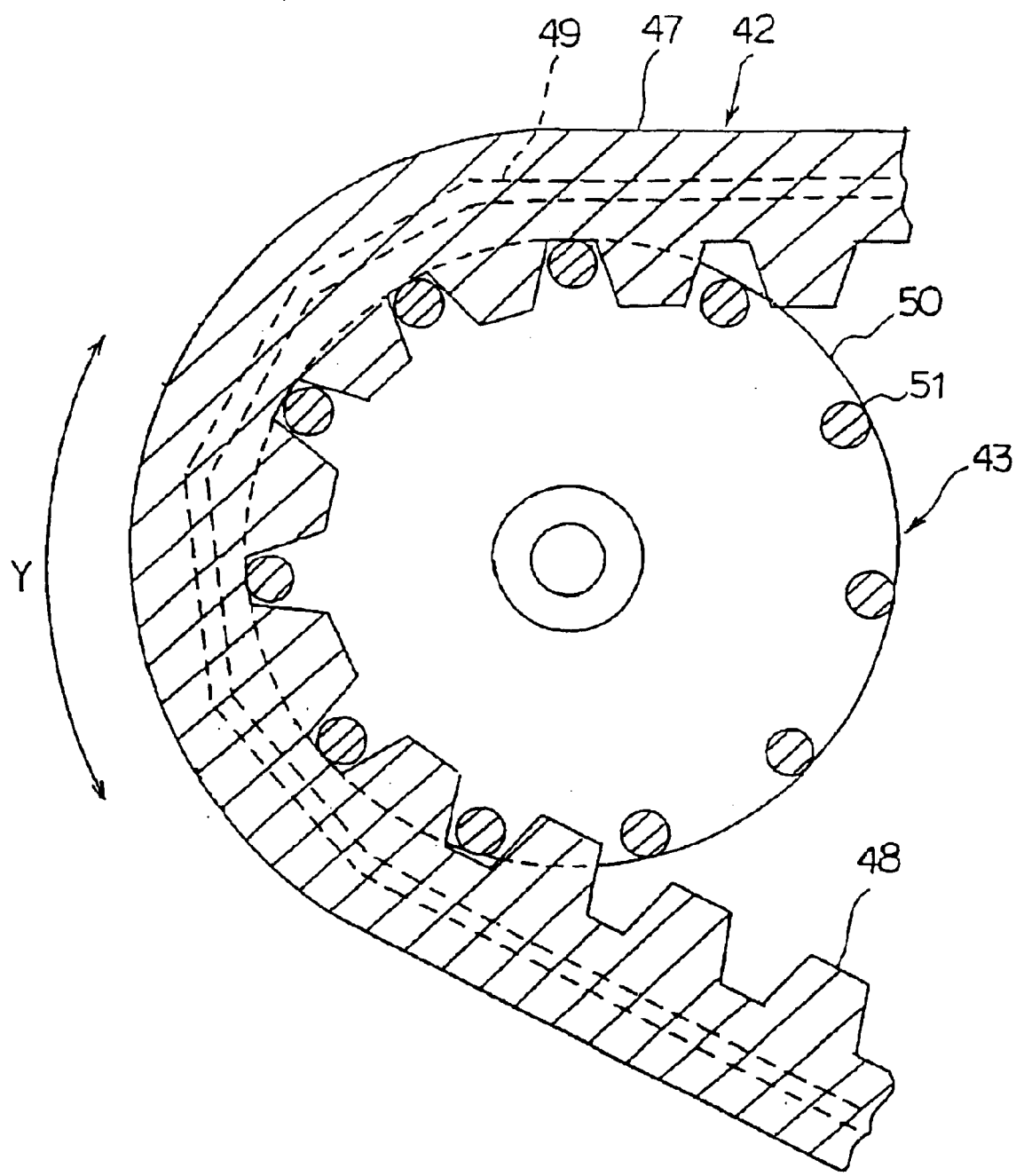
FIG. 15 is a sectional view taken along arrow marks Q—Q in FIG. 13.

FIG. 15 shows the wrapping state when the drive tooth portion is not projected as described above. Comparing FIG. 15 and FIG. 7, a degree of deformation of the tension member 14 in FIG. 7 is smaller than a degree of deformation of the tension member 14 in the polygonal shape in FIG. 15, and the extending tension force exerted on the tension member 14 in the state of FIG. 7 is more uniform than that in the state of FIG. 15.

Figure 8:
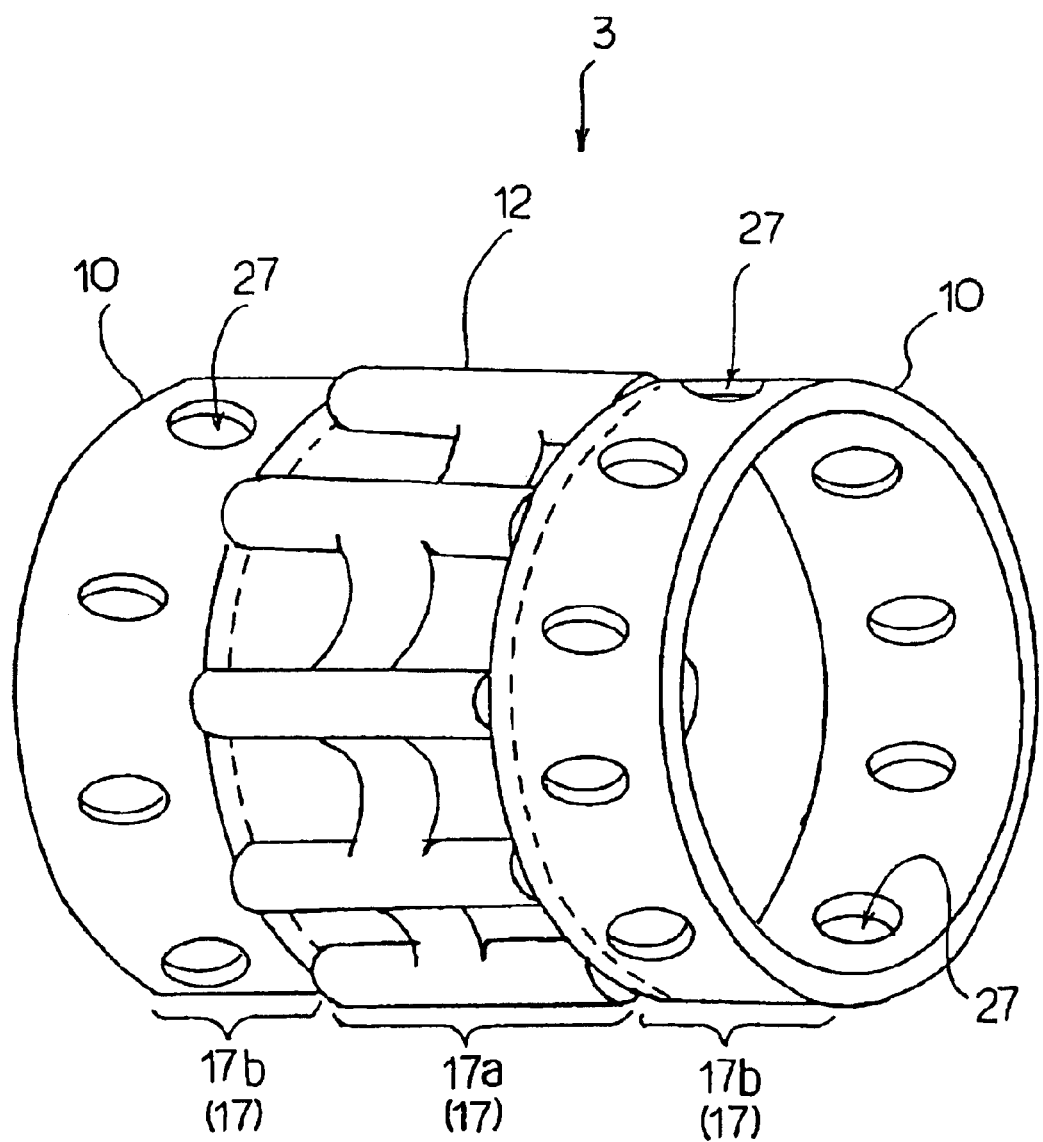
FIG. 8 is a perspective view showing a fourth embodiment of a sprocket for a crawler belt according to the invention.

FIG. 8 shows a fourth embodiment of a sprocket for a crawler belt according to the invention.

The sprocket 3 for the crawler belt according to the fourth embodiment is constituted by sandwiching both left and right sides of the sprocket 3 for the crawler belt of the first embodiment with the pair of barrel portion main bodies 10 of the third embodiment.

When the sprocket for the crawler belt according to the invention is required larger strength, the sprocket for the crawler belt according to the fourth embodiment may be adopted.

Figure 9:
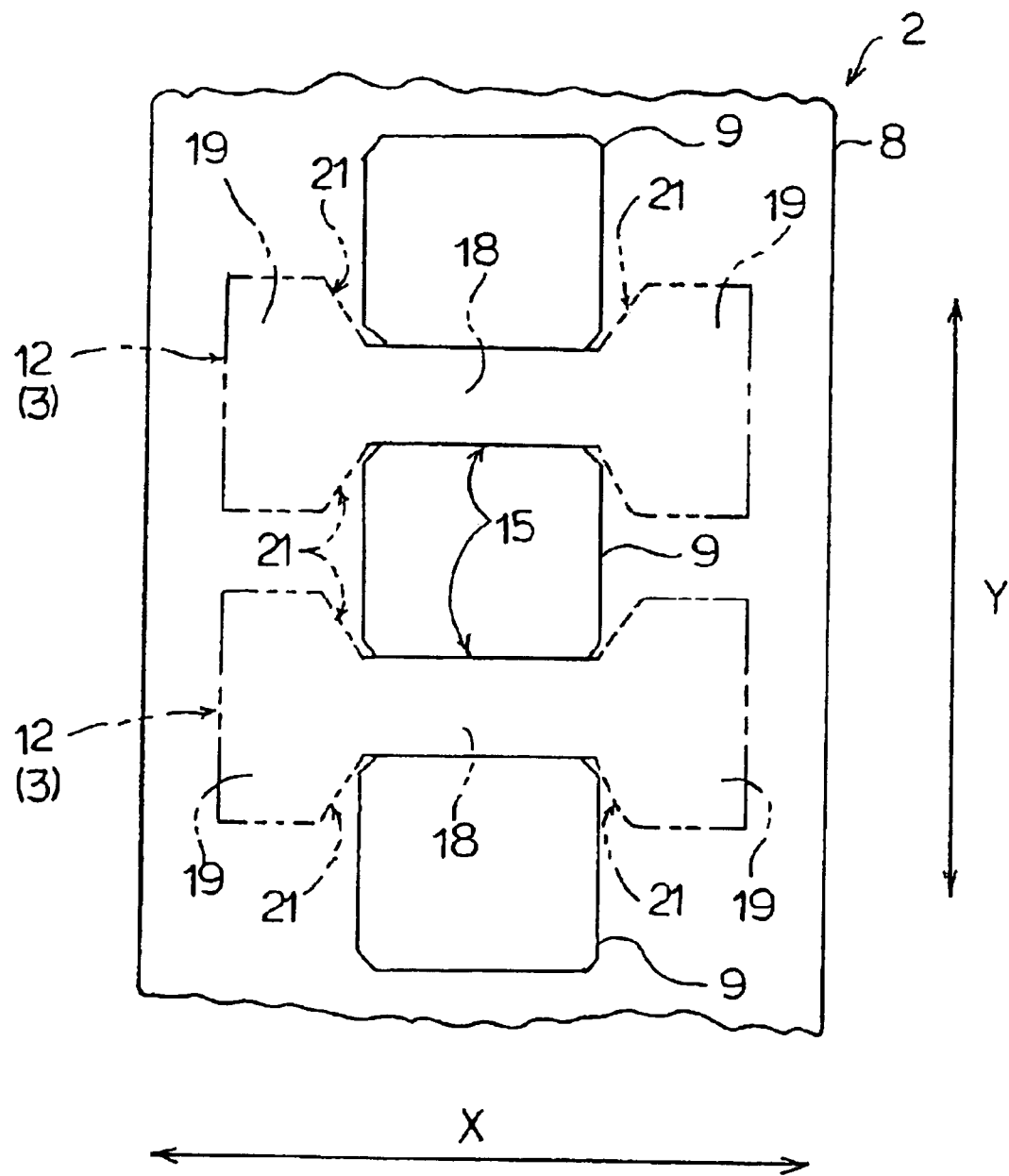
FIG. 9 is a plan view showing a fifth embodiment of a sprocket for a crawler belt according to the invention.
Figure 10:
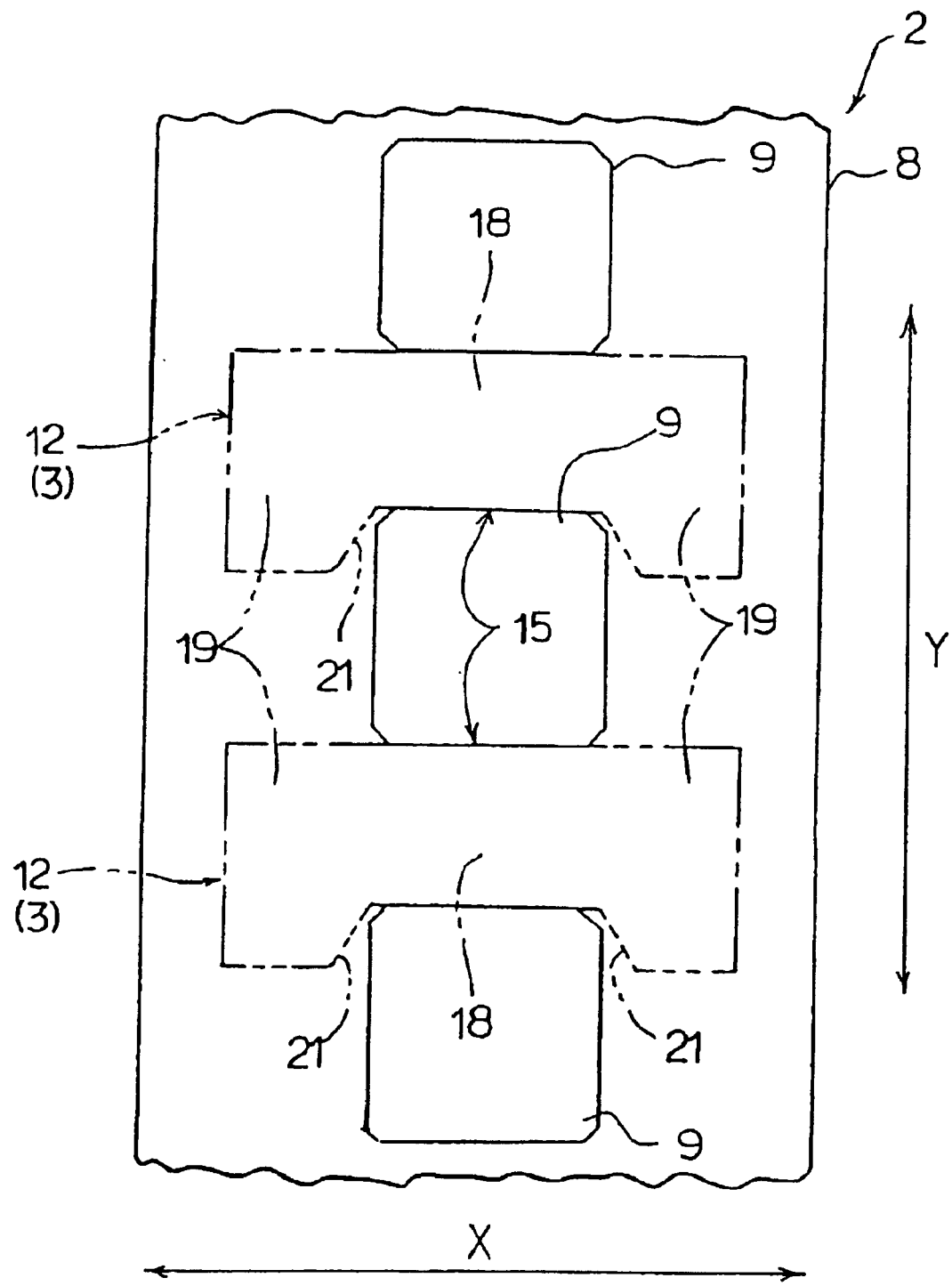
FIG. 10 is a plan view showing a sixth embodiment of a sprocket for a crawler belt according to the invention.
Figure 11:
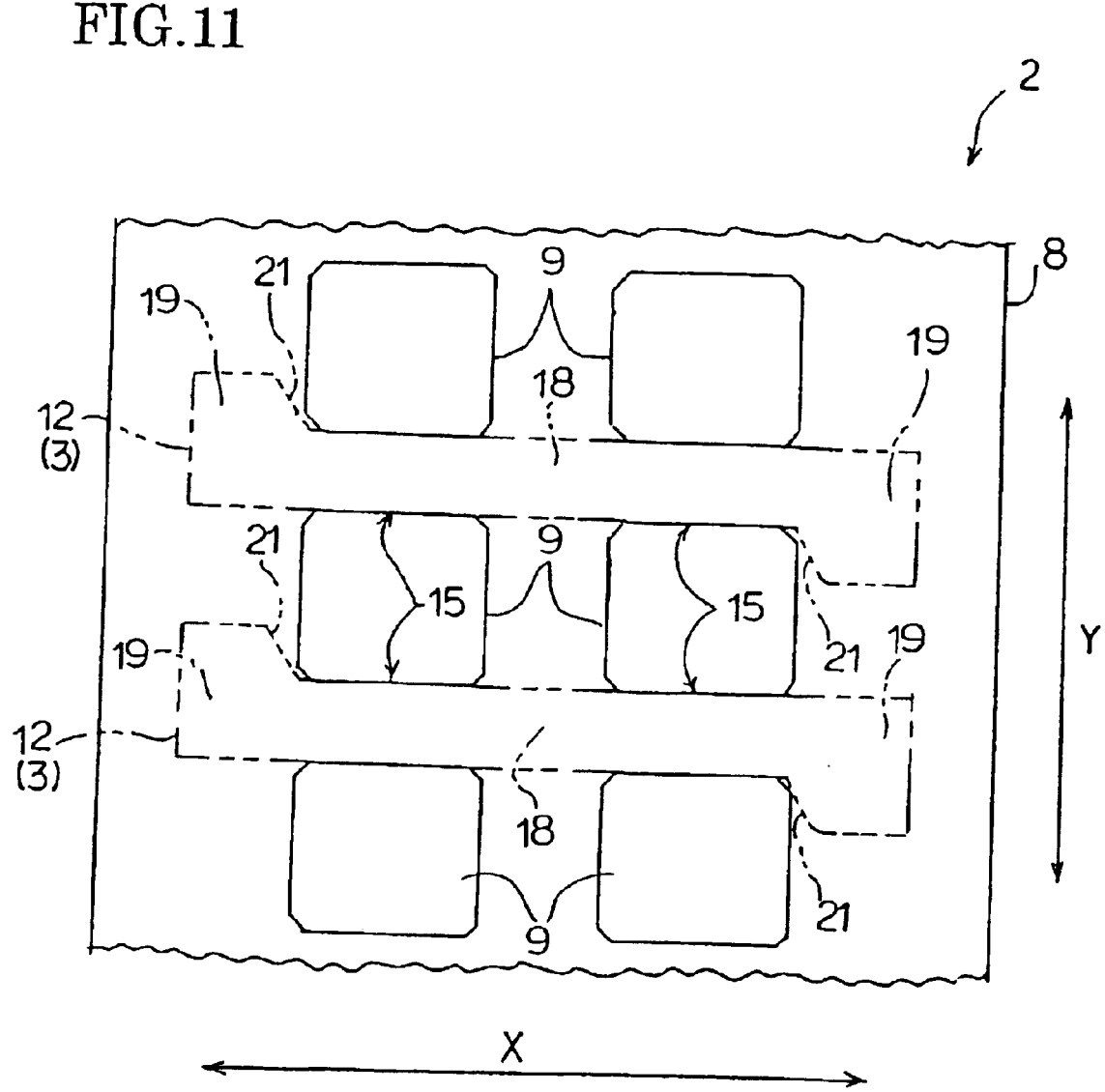
FIG. 11 is a plan view showing a seventh embodiment of a sprocket for a crawler belt according to the invention.

FIG. 9 through FIG. 11 show states of wrapping the elastic crawler around the sprocket for the crawler belt as explained in the second embodiment, and an explanation will be given of a relationship of engaging the drive tooth portion of the sprocket for the crawler belt and the elastic crawler as follows.

FIG. 9 shows a fifth embodiment of a sprocket for a crawler belt (drive tooth portion) according to the invention.

In FIG. 9, there is shown a state of bringing the elastic crawler and the sprocket for the crawler belt (drive tooth portion) into mesh with each other and only the drive tooth portion 12 is shown by imaginary lines of two-dotted chain lines (hereinafter, the same in FIG. 10, FIG. 11).

The drive tooth portion 12 shown in FIG. 9 is mainly constituted by a driving portion 18 fitted in the engaging groove 15 for transmitting the driving force to the elastic crawler 2 and the guide portion 19 engaged with the projection 9 in the belt width direction for restricting shift (lateral shift) in the belt width direction of the sprocket 3 for the crawler belt and the elastic crawler 2 relative to each other (hereinafter, the same in FIG. 10, FIG. 11).

The width of the driving portion 18 in the peripheral direction (direction indicated by notation Y) of the belt main body 8 (hereinafter, the width in the direction is referred to as peripheral direction width) is substantially made to be equal to the peripheral direction width of the engaging groove 15, meanwhile, the peripheral direction width of the guide portion 19 is made larger than the peripheral direction width of the engaging groove 15.

With this arrangement, when the elastic crawler 2 and the sprocket 3 for the crawler belt are shifted from each other in the belt width direction (when lateral shift is caused), the guide portion 19 is abutted (brought into contact with) to the projection 9 and further shift of the sprocket for the crawler belt (drive tooth portion 12) can be restricted.

Here, the guide portion 19 has a face to be abutted to the projection 9, which is designated by notation 21 as the restricting face for restricting the lateral shift. The restricting faces 21 are formed on the guide portions 19 to be engaged with both of each pair of projections 9 adjacent in the peripheral direction Y for forming the engaging groove 15.

It is preferable that each of the restricting faces 21 is provided to be inclined to so that a clearance from the projection 9 increases toward each of opposite ends of the guide portion in the belt width direction as shown by FIG. 9.

With this configuration, since the restricting face 21 is inclined to the direction of the lateral shift (belt width direction), even when the projection 9 abuts the restricting face, soil (mud) brought between the projection 9 and the restricting face 21 is hardly stuck on the restricting face 21.

Further, in order to restrict the lateral shift between the sprocket 3 and the elastic crawler 2 both in left and right directions, it is necessary to form a left and right pair of the restricting faces 21 relative to the center of the drive tooth portion 12 in the longitudinal direction thereof so as to be disposed on both sides of the projection 9 in the belt width direction.

FIG. 10 shows a sixth embodiment of a sprocket for a crawler belt (drive tooth portion) according to the invention.

According to the sixth embodiment, the restricting faces 21 for restricting the lateral shift of the elastic crawler 2 and the drive tooth portion 12 relative to each other are provided on the guide portions 19 to be engaged with one of the pair of the adjacent projections 9 for forming the engaging groove 15.

Even when the restricting faces 21 are provided to the guide portions 19 in this way, similar to the fifth embodiment, the lateral shift can be restricted by constituting a pair of left and right restricting faces 21 relative to the center of the drive tooth portion 12 in the longitudinal direction thereof.

FIG. 11 shows a seventh embodiment of a sprocket for a crawler belt (drive tooth portion) according to the invention.

According to the seventh embodiment, there are provided two rows of the projections 9 formed to project from the elastic crawler 2 along the peripheral direction Y of the belt main body 8.

The restricting faces 21 of the guide portion 19 according to this embodiment are formed in a so-to-speak zigzag shape relative to the peripheral direction Y of the drive tooth portion 12. Even when the restricting faces 21 are provided in such a pattern (zigzag shape), the lateral shift can be restricted similar to the fifth and the sixth embodiments since the restricting faces 21 constitute a left and right pair relative to the center of the drive tooth portion 12 in the longitudinal direction thereof.

When the elastic crawler traveling apparatus explained with FIG. 12 provided with the sprockets for the crawler belt having characteristics explained in the first through the seventh embodiments as described above is driven, the tension member embedded in the elastic crawler can be prevented from being exerted with local force as much as possible, whereby the elastic crawler traveling apparatus can obtain the elastic crawler having prolonged service life.

According to the invention explained in details as described above, there is provided an elastic crawler traveling apparatus capable of reducing exertion of local force on the tension member embedded in the elastic crawler as less as possible and a sprocket for the crawler belt used in the elastic crawler traveling apparatus.

It should be noted that the invention is not limited to the embodiments explained above but can be modified variously as follows.

The elastic crawler traveling apparatus according to the invention is not limited to the apparatus explained in reference to FIG. 12 but may be any apparatus so far as the apparatus is provided with an elastic crawler formed in a shape of an endless belt by an elastic material of rubber or the like, a sprocket for a crawler belt arranged to be brought into contact with an inner face of the elastic crawler, a driven wheel, and a rolling wheel.

A pattern of forming the restricting face formed at the guide portion for restricting the lateral shift is not limited to the patterns explained in the fifth through the seventh embodiments but may be any pattern so far as the pattern constitutes a left and right pair relative to the center of the drive tooth portion in the longitudinal direction thereof.

Further, although according to the seventh embodiment, two rows of the projections 9 are formed to project from the inner face of the elastic crawler along the peripheral direction of the belt main body, the number of rows of the projection 9 is not limited to one or two but even when three or more rows (plural rows) thereof are formed, the drive tooth portion of the sprocket for the crawler belt according to the invention can be engaged therewith.

When two or more rows of the projections are constituted as described above, the drive tooth portion having the guide portions may be provided on the sprocket for the crawler belt such that the guide portions are engaged with the projections of respective rows.

The sizes and the number of the mud discharging holes 27 formed along the peripheral portion of the barrel portion main body 10 may be varied in consideration of strength or the like of the drive portion main body 10.

The constitution of the tension member embedded in the elastic crawler is not limited to the constitution in which a plurality of tension members formed of steel cord or the like are embedded within the embedding width but, for example, the tension member may be a member of a strip-like shape having a constant width.

What is claimed is:

1. An elastic crawler traveling apparatus comprising:
   an elastic crawler in a shape of an endless belt formed of an elastic material,
   a sprocket for a crawler belt arranged to be brought into contact with an inner face of the elastic crawler,
   a driven wheel; and
   a rolling wheel,
   wherein the elastic crawler comprises a belt main body; a plurality of projections formed to project at intervals therebetween along a peripheral direction of the elastic crawler on the belt main body; and a tension member embedded in an inner portion of the belt main body for restricting elongation of the belt main body,
   wherein the sprocket for the crawler belt comprises a contact portion to contact the belt main body, the contact portion having a contact width which is greater than a root width of the projections in a belt width direction of the elastic crawler;
   wherein the sprocket for the crawler belt comprises a plurality of drive tooth portions for engaging with the projections, a barrel portion main body being integrally formed with the drive tooth portions;
   wherein each pair of the projections that is adjacent in the peripheral direction of the elastic crawler has a valley portion formed therebetween as an engaging groove for being engaged by the drive tooth portions; and
   wherein the drive tooth portions comprise a driving portion to be engaged with the engaging groove in the peripheral direction of the elastic crawler; and a guide portion to be engaged with the projections in the belt width direction for restricting shifting of the drive tooth portions and the projections in the belt width direction relative to each other.

2. An elastic crawler traveling apparatus comprising:
   an elastic crawler in a shape of an endless belt formed of an elastic material,
   a sprocket for a crawler belt arranged to be brought into contact with an inner face of the elastic crawler,
   a driven wheel; and
   a rolling wheel, wherein the elastic crawler comprises a belt main body; a plurality of projections formed to project at intervals therebetween along a peripheral direction of the elastic crawler on the belt main body; and a tension member embedded in an inner portion of the belt main body for restricting elongation of the belt main body, wherein the sprocket for the crawler belt comprises a contact portion to contact the belt main body, the contact portion having a contact width which is substantially equal to an embedding width of the tension member in a belt width direction of the elastic crawler, wherein the sprocket for the crawler belt comprises a plurality of drive tooth portions for engaging with the projections; and a barrel portion main body integrally formed with the drive tooth portions;

wherein each pair of the projections that is adjacent in the peripheral direction of the elastic crawler has a valley portion formed therebetween as an engaging groove for being engaged by the drive tooth portions; and wherein the drive tooth portion comprises a driving portion for engagement with the engaging groove in the peripheral direction of the elastic crawler; and a guide portion for engaging with the projections in the belt width direction for restricting shifting of the drive tooth portion and the projection in the belt width direction relative to each other.

3. The elastic crawler traveling apparatus according to claim 1, wherein the guide portion includes a pair of right and left restricting faces for contacting opposite sides of the projections in the belt width direction for restricting shifting of the projections relative to the drive tooth portions in the belt width direction.

4. The elastic crawler traveling apparatus according to claim 3, wherein each of the restricting faces is inclined so that a clearance from the projections increases toward each of opposite ends of the guide portion in the belt width direction.

5. The elastic crawler traveling apparatus according to claim 2, wherein the guide portion includes a pair of right and left restricting faces for contacting opposite sides of the projections in the belt width direction for restricting shifting of the projections relative to the drive tooth portions in the belt width direction.

6. The elastic crawler traveling apparatus according to claim 5, wherein each of the restricting faces is inclined so that a clearance from the projections increases toward each of opposite ends of the guide portion in the belt width direction.

7. The elastic crawler traveling apparatus according to claim 1, wherein the barrel portion main body is formed with a recess portion between each pair of the drive tooth portions that are adjacent in the peripheral direction of the barrel portion main body so as to prevent a projected end portion of each of the projections and the barrel portion main body from being brought into contact with each other.

8. The elastic crawler traveling apparatus according to claim 2, wherein the barrel portion main body is formed with a recess portion between each pair of the drive tooth portions that are adjacent in the peripheral direction of the barrel portion main body so as to prevent a projected end portion of each of the projections and the barrel portion main body from being brought into contact with each other.

* * * * *